United States Patent Office 3,451,255
Patented June 24, 1969

3,451,255
GAS ANALYSIS APPARATUS
James R. Neville, 213 Tuttle Road, San Antonio,
Tex. 78209, and Kenneth G. Ikels, 242 S. Sycamore, New Braunfels, Tex. 78130
Filed Apr. 7, 1966, Ser. No. 541,037
Int. Cl. G01n 31/08
U.S. Cl. 73—23.1                                    5 Claims

ABSTRACT OF THE DISCLOSURE

A sample of a gas to be tested is separated into its constituents by passing it through a column of absorbent material. Oxygen or an oxygen mixture is used as the carrier gas. An oxygen sensor is used to measure the diluting effect of the constituent gases on the carrier gas. The output of the oxygen sensor is applied to an indicator and a recorder.

---

The invention described herein may be manufactured and used by or for the United States Government for governmental purposes without the payment to us of any royalties thereon.

This invention relates to a device for analysis of gas and vapor constituents of a mixture.

One object of the invention is to provide for a device for gas analysis which requires fewer components then prior art devices.

Another object of the invention is to provide a device for gas analysis in which a lower gas flow is required.

A further object of the invention is to provide a device for gas analysis which provides both a qualitative and quantitative analysis of a gas.

These and other objects will become apparent from the following detailed description taken with the drawing wherein.

In most commerical embodiments of chromatographic type instruments, the detector is not specific in that it responds to the changes in the thermal conductivities of the specially arranged mixtures. In such arrangements, since the thermal conductivity of gas mixtures is not a specific property of such a mixture, it is necessary to arrange dual detectors in such a manner that the reference or carrier gas is always presented to one of those detectors and the carrier gas plus the unknown constituents of the samples are presented to the other detector. The current signal of interest in such arrangements is the difference in current signal passing through both detectors. These arrangements require a greater number of components than the present invention. Additionally, larger gas flows are required where dual detectors are used instead of a single detector whose current signal is directly related to one of tne constituents of the carrier gas According to this invention a means is provided to separate the constituents of a gas mixture, as in a column of absorbent material. The concentration of a particular gas separated by the column of absorbent material will be related to the diluting affect such a gas has on a carrier gas concentration when the gas is eluted from the column. Oxygen or an oxygen mixture can be used for the carrier gas. An oxygen sensor, such as described in U.S. Patent No. 3,071,530, is then used to sense the diluting effect of the gas on the oxygen carrier. The output signal of the oxygen sensor is applied to an indicator and a recorder.

Figure 1:
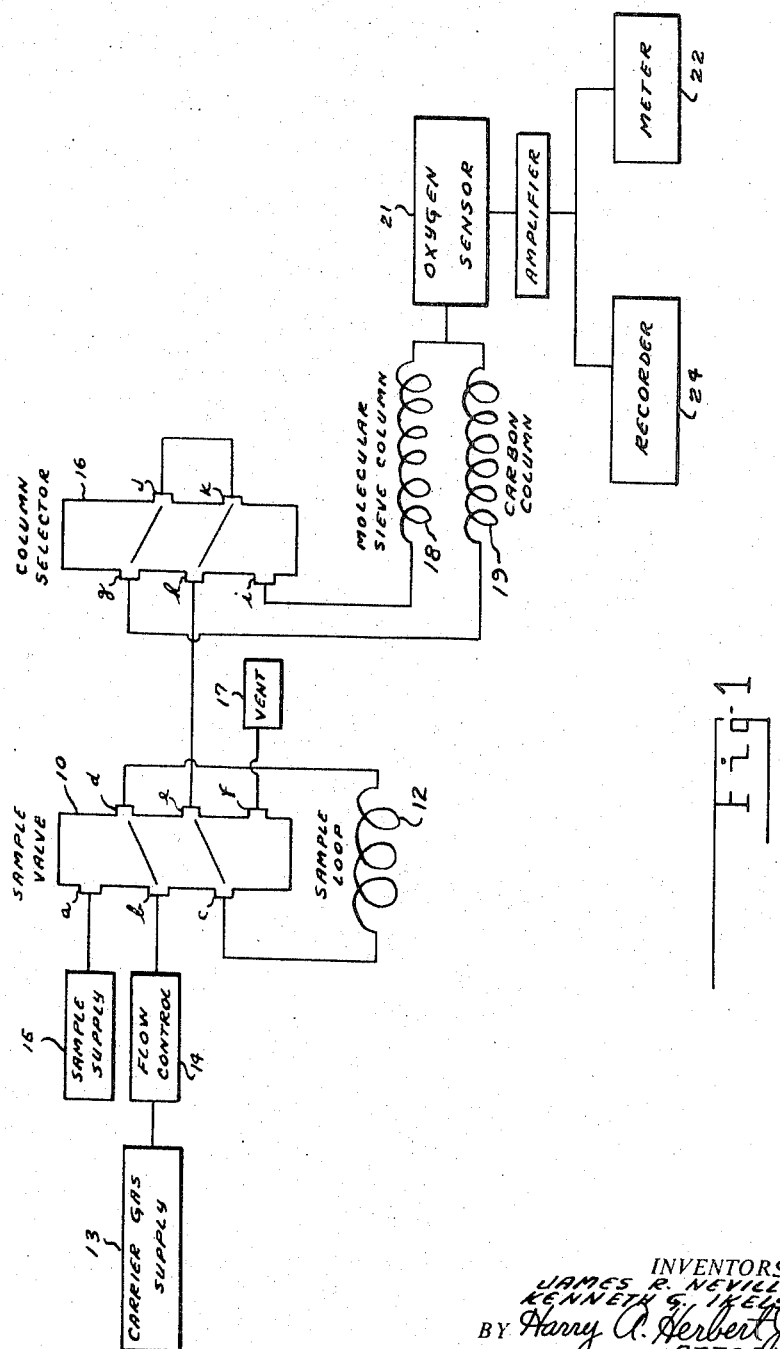
FIG. 1 is a block diagram of a gas analysis apparatus according to the invention.

Reference is now made to FIG. 1 of the drawing which shows a sample valve 10, having a sample loop 12, connected between two of its ports $d$ and $c$. A carrier gas, such as oxygen from supply 13 is connected to port $b$ through a flow control valve 14. A sample, from supply 15, of the gas under test is connected to port $a$. The output of sample valve 10, port $e$, is connected to port $h$ of a column selector valve 16. Port $f$ is vented to the atmosphere, as indicated at 17. A molecular sieve column 18 is connected to port $i$ and a carbon column 19 is connected to port $g$, of column selector 16. Ports $j$ and $k$ of column selector 16 are interconnected. The output of the molecular sieve column 18 and carbon column 19 are applied to an oxygen sensor 21. The output signal of the oxygen sensor 21 is amplified and applied to a meter 22 and a constant speed recorder 24.

Any suitable 6-port valve such as a GCL–M 4006 which is available from Micro Tek Instruments, Inc., may be used at 10. Any suitable 5-port valve such as the GCL–M 4005 of Micro Tek Instruments, Inc., may be used at 16. The sample loop 12 may be a copper tube of predetermined volume. The particular chromatographic column used would be determined by the particular gas to be analyzed. In the device built, column 18 consisted of a 12′ x ¼″ copper tube packed with molecular sieve type 5a material, $Na[(AlO_2)_{12}(SiO_2)_{12}]$, and the column 19 consisted of a 4′ x ¼″ copper tube packed with deactivated carbon. Column 19 could be packed with silica gel if desired.

Figure 2:
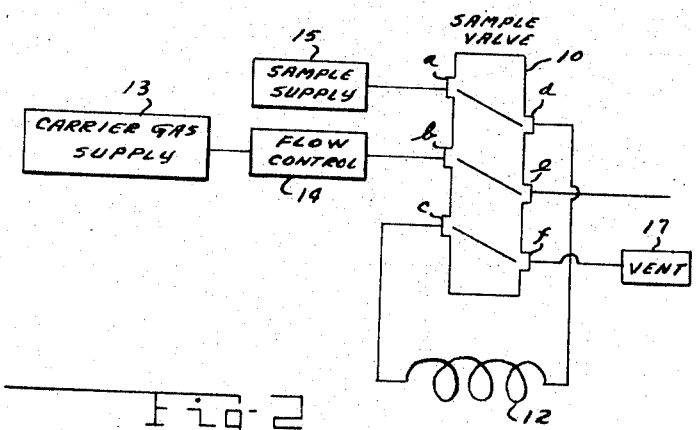
FIG. 2 is a block diagram showing the sample valve in the position for supplying a sample to the sample loop.
Figure 3:
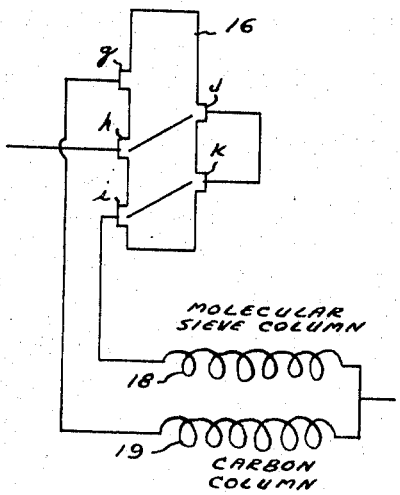
FIG. 3 is a block diagram showing the column selector in its alternate position.
Figure 4:
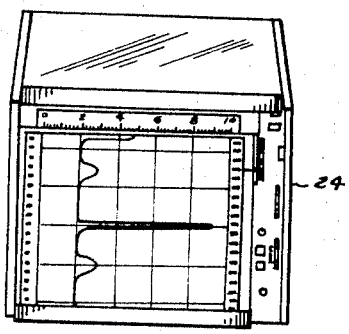
FIG. 4 is an isometric view of the recorder for the device of FIG. 1.

In the analysis of the atmospheric gases of a closed ecological system, using oxygen as the carrier gas, the sample valve is positioned as shown in FIG. 2 and the sample loop is thoroughly flushed with the gas to be analyzed. In order to analyze for $N_2$, He, Ne, A, etc., the molecular sieve column 18 is selected and the sample introduced into the system. The sample gas flows from port $a$ to port $d$ in valve 10, through sample loop 12 to port $c$ then out through vent 17. The sample valve 10 is then moved to the position shown in FIG. 1. The carrier gas then flows from port $b$ to port $d$, through sample loop 12. The sample gas and carrier gas then flow through port $c$ to port $e$, through the column selector 16 and into column 18. The sample gases are first absorbed in the column 18 and then differentially eluted according to the partition coefficient of the constituent gases of the samples. The gas stream issuing from the column 18 then contains a series of spacially arranged mixtures of the individual gases in the carrier gas. These mixtures serve, in effect, to change the concentration of the carrier gas flowing to the oxygen sensor 21 according to the concentration of the unknown constituent. He, Ne, A, $N_2$ i.e. separated in that order while $CO_2$ if any is absorbed by the molecular sieve. As the gas flows through the oxygen sensor the current signal of the sensor varies in accordance with the effect which the eluted gas had upon the concentration of the carrier gas in the spacially arranged mixture. This current signal is amplified and presented to current measuring device 22 and to recorder 24 for recording upon a scale which indicates after calibration, the current or concentration of the unknown gas on one axis and time sequence in which the unknown gases are separated on the other axis as shown in FIG. 4. Since the spacially arranged mixtures of the unknown gases are presented to the sensor serially in time, the time axis can then be calibrated in terms of particular constituents which might be present in the sample. Thus, the record serves both qualitative and quantative functions of chemical analysis. For the analysis of $CO_2$ a similar procedure is followed except a carbon or silica gel column is placed in the system. In this case He, Ne, $N_2$ and A pass through the column as an unseparated mixture while the $CO_2$ is retained for a longer period before elution from the column. To control the separation of the gases, the flow rate is adjusted in accordance with the requirements of the constituents to be measured. For example, in the determination of a mixture of gases containing for instance, He, A. $N_2$ and $O_2$, the flow of the carrier gas is set ideally for 20 to 40 cc. per minute which permits optimum reproduction of these constituents.

There is thus provided a device for analysis of gas and vapor constituents of a mixture.

While certain specific embodiments have been described, it is to be understood that numerous changes may be made without departing from the general principles and scope of the invention.

We claim:

1. A device for use in the analysis of gas and vapor constituents of a mixture comprising: at lease one chromatographic column; means for directing a flow of a carrier gas containing oxygen through said column; means for supplying a measured amount of said mixture to be tested, to said carrier gas; oxygen sensing means connected to the output of said column for sensing the diluting effect of the mixture components, separated and eluted from by said column on said carrier gas, and indicating means connected to the output of said sensing means.

2. The device as recited in claim 1 wherein said indicating means is a constant speed recorder.

3. The device as recited in claim 1, to analyze for nitrogen, helium, neon, argan and carbon dioxide, wherein two chromatographic columns are provided, the first of said columns being a molecular sieve column and the second of said columns being a carbon column; means for selectively directing the flow of carrier gas and the gas to be tested through one of said columns to said sensing means.

4. The device as recited in claim 3 wherein said means for supplying a measured amount of gas, to be tested, to said carrier gas is a copper tube of predetermined length; means for supplying a sample of the gas to be tested to said copper tube and means for selectively directing said carrier gas through said copper tube to carry the sample, of the gas to be tested, to a predetermined one of said chromatographic columns and through said sensing means after separation in said column.

5. The device as recited in claim 4 wherein said indicating means is a constant speed recorder.

References Cited

UNITED STATES PATENTS

| 3,169,832 | 2/1965 | Gallaway et al. | 23—232 |
| 3,056,277 | 10/1962 | Brenner | 73—23 |
| 2,972,888 | 2/1961 | Lamkin | 73—422 |
| 3,234,779 | 2/1966 | Dawson. | |

OTHER REFERENCES

"Nitrogen, Oxygen, Argon, Composition Analysis—New Chromatographic Methods," by Wilson et al. Advances in Cryogenic Engineering, vol. 9, pp. 423–429, Plenum Press, New York, 1964.

RICHARD C. QUEISSER, *Primary Examiner.*

VICTOR J. TOTH, *Assistant Examiner.*

U.S. Cl. X.R.

55—197.